W. OTTO.
COMPASS FOR SHIPS OR THE LIKE.
APPLICATION FILED SEPT. 16, 1913.

1,231,933.

Patented July 3, 1917.

WITNESSES:

INVENTOR
WOLFGANG OTTO
BY
ATTORNEYS

UNITED STATES PATENT OFFICE.

WOLFGANG OTTO, OF NEUMÜHLEN, NEAR KIEL, GERMANY, ASSIGNOR TO ANSCHÜTZ & CO., OF NEUMÜHLEN, NEAR KIEL, GERMANY.

COMPASS FOR SHIPS OR THE LIKE.

1,231,933.      Specification of Letters Patent.      Patented July 3, 1917.

Application filed September 16, 1913. Serial No. 789,986.

*To all whom it may concern:*

Be it known that I, WOLFGANG OTTO, a subject of the Emperor of Germany, residing in Neumühlen, near Kiel, Germany, Heikendorfer Weg 9, have invented certain new and useful Improvements in Compasses for Ships or the like, of which the following is a specification.

This invention is an improvement in or modification of that set forth in patent to Hermann Anschütz-Kaempfe for gyroscope-compass 1,092,816 dated April 14, 1914, in which the receiving apparatus, for transmission from a distance of compass indications, was arranged in such a manner that the movements of the main compass card were reproduced after having been mechanically magnified, on a secondary card.

A construction of such a receiving apparatus forms the subject of this invention. According to the same, the movements of the compass card are also reproduced, after having been mechanically magnified, but in place of a secondary card, is used an index or an optical signal, the movements of which are intended to give to the pilot a starting point for estimating even the least deviations of the ship in an easily recognizable manner. The index or the optical signal is then no longer used for an accurate measurement of the angular movements of the ship, but merely for indicating their direction (port or starboard) and for estimating their speed; the actual angular movements can be read either on the main card of the receiving apparatus, or the new construction can be combined in one and the same apparatus with the construction described in the above mentioned prior specification.

Figure 1:
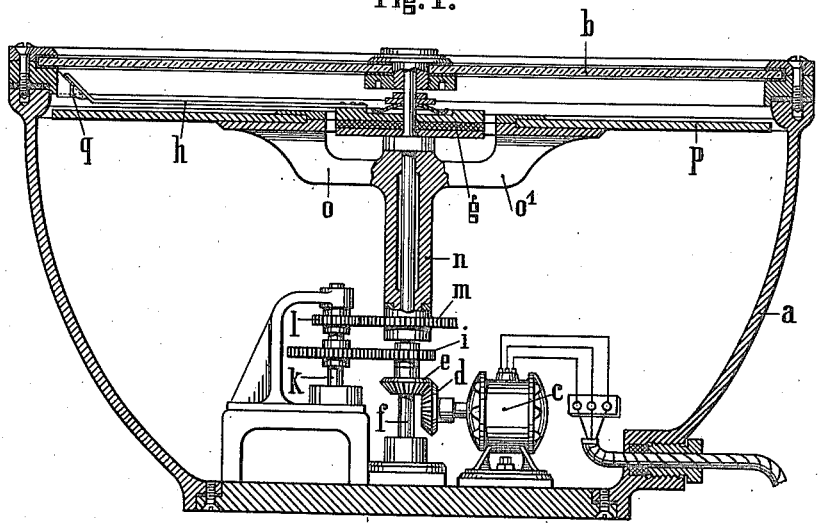
Figure 2:
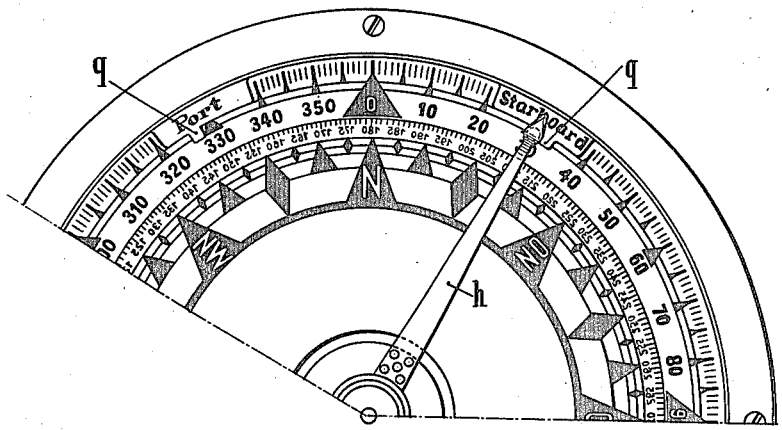

Figures 1 and 2 show a construction according to this invention. $a$ is the casing of the receiving apparatus, covered with a glass plate $b$ and containing the driving motor $c$ for the receiving apparatus. The latter rotates, by means of the bevel wheels $d$ and $e$, the spindle $f$ which supports the index $h$ by means of the friction coupling $g$. The spindle $f$ carries moreover a toothed wheel $i$ which is in engagement with the spindle $k$. The latter rotates in its turn, by means of toothed wheels $l$ and $m$, a sleeve $n$ mounted loosely on the spindle $f$ and supporting by means of arms $o$ and $o'$, the main card $p$. The movement of the index to the right and left is limited by the stops $q$. It will be seen that, when the spindle $f$ rotates in one or in the other direction, the index $h$ will participate in its movement until it is stopped by the stop $q$.

If the ratio of transmission between the spindle $f$ and the main card $p$ is made sufficiently great, the result will be that the smallest reversion of the direction of movement will be indicated by one large oscillation of the index, in a very clear manner. The pilot can therefore, even without paying very careful attention, recognize easily the important moment when the ship obeying the action of the rudder, will make an angular turning to the other side, and accordingly operate the rudder again.

What I claim is:

1. In a compass, a main card and an index both mounted to rotate about a common axis, transmission means between said card and index whereby their rotation tends to take place at different but definitely related angular velocities, the index being given the greater velocity, a shaft frictionally engaged with said index for driving the same, and stops for limiting the angular movement of the index without interference with its driving shaft.

2. In a compass, in combination with a mounting, a driving shaft, a main card mounted to rotate concentrically with said shaft, gearing between said shaft and said card for driving the card from the shaft at a smaller angular velocity, an index frictionally mounted upon the shaft so as to rotate therewith in a plane parallel to the card, and stops attached to the compass mounting and disposed to confine the movements of the index, with respect to said mounting, within a definite angle without interference with the rotation of the shaft.

In witness whereof I have hereunto signed my name this 2nd day of September 1913 in the presence of the two subscribing witnesses.

WOLFGANG OTTO.